March 28, 1967   J. VANDER JAGT   3,311,107
ICE FISHING UNIT
Filed Oct. 6, 1965
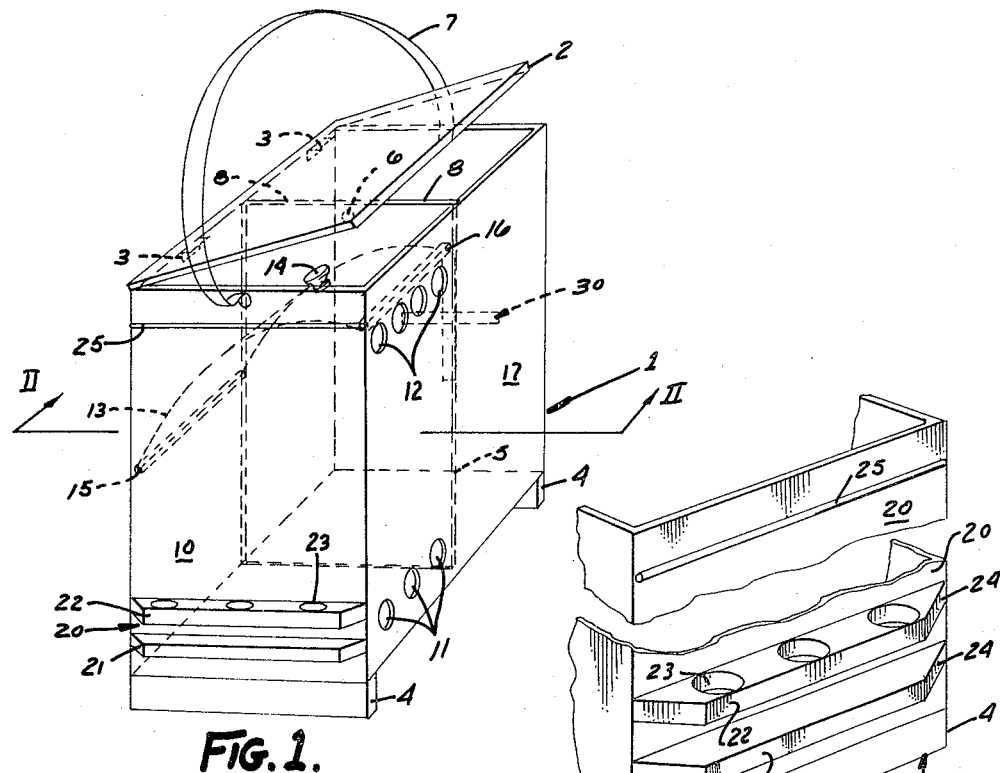
FIG. 1.
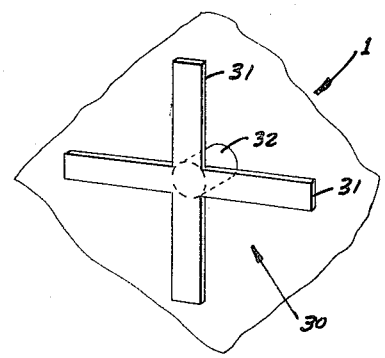
FIG. 3.
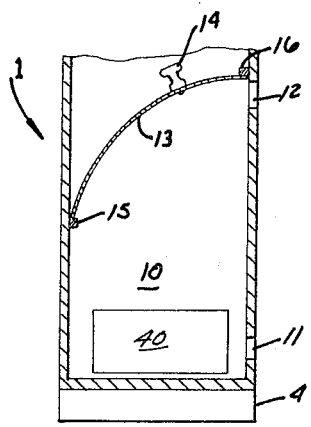
FIG. 2.
FIG. 4.
INVENTOR.
JAMES VANDER JAGT
BY
ATTORNEYS

United States Patent Office 3,311,107
Patented Mar. 28, 1967

3,311,107
ICE FISHING UNIT
James Vander Jagt, 15702 Pruin St.,
Spring Lake, Mich. 49456
Filed Oct. 6, 1965, Ser. No. 493,446
8 Claims. (Cl. 126—204)

This invention relates to portable heating boxes for ice fishermen or hunters and, more specifically, to boxes combining the functional aspects of a heater, seat and utility box.

Ice fishermen and hunters customarily carry a sturdy box to the fishing or hunting site. The box is utilized as a seat while fishing or hunting. Usually, the box is provided with a lid such that fishing tackle, lunches and other accessories may be stored therein. This invention contemplates one such box which contains additionally a portable heating unit.

It is an object of this invention to provide a portable heating box for use by sportsmen which may be manufactured and sold relatively inexpensively.

It is an object of this invention to provide a portable heating box which does not contain an integral heating unit, but rather, may be utilized in conjunction with any heating unit of proper dimensions which the buyer may already possess.

It is an object of this invention to provide a portable heating box for sportsmen which has sufficient structural strength to support the sportsman when he sits on it, and yet, does not weigh so much as to render its transportation to the fishing or hunting site impractical.

It is a further object of this invention to provide a portable heating box which combines in the same unit the functional aspects of a separate utility box.

It is another object of this invention to provide a portable heating box having fishing rod and rope carrying assemblies attached thereto.

These and other objects will be made more clear by reference to the following figures in which:

FIG. 1 is a perspective view of the device which is the subject of this invention;

FIG. 2 is a cross-sectional view taken along line II—II of FIG. 1;

FIG. 3 is a broken away exploded perspective showing the fishing pole carrier assembly; and, FIG. 4 is a broken away exploded perspective showing the rope holder assembly.

Briefly, the objects of this invention are accomplished by providing an enclosure having a bottom, a plurality of sides and a lid removably mounted thereto. The enclosure is divided by a partition into two chambers. The first of these chambers has a plurality of cold air intake vents along the bottom of one wall and a plurality of warm air outlet vents along the top of that same wall. The first chamber receives a heating unit. An arcuate air baffle of approximately the same width as the first chamber is provided therein. This baffle functions to direct the air entering the chamber through the air intake past the heating unit and out the warm air exit vent. The second chamber forms a handly utility box which may be utilized to carry lunches, fish or the like.

Referring now to the figures a specific and preferred embodiment of this invention will be discussed in detail. FIG. 1 is a perspective view of the heating box. As may be seen, it comprises an outer enclosure 1 which has a bottom, four rectangular sides, and a lid 2. The lid is preferably affixed to the enclosure by means of hinges indicated generally at 3. A pair of legs 4 are affixed to the bottom of the enclosure at each end thereof. In addition to reinforcing the structural characteristics of the heating box, legs 4 prevent melting of the ice when the heating box is utilized by an ice fisherman.

A partition 5 is slidably mounted in the enclosure 1. The partition is positioned and retained in place by means of slots 8 provided in the opposing wall of the enclosure as shown in FIG. 1. The partition 5 may be spaced at any point along the length of the container so that sufficient space is provided on one side of the enclosure to receive the heating unit. The partition 5 is preferably provided with a grasping means such that it may be easily removed from the enclosure 1. A hole, indicated generally at 6, has been found satisfactory for this purpose. A carrying strap 7 of any desired length is affixed to the enclosure to facilitate transporting the heating box to and from the fishing or hunting location.

Referring now to FIGS. 1 and 2 it will be seen that a heater unit chamber 10 is formed by the enclosure and the partition 5. A series of apertures or vents 11 are provided along the bottom of one wall of the enclosure. A second series of apertures or vents 12 are provided near the top of the same wall. Arcuate air baffle 13 having a heat insulated pull 14 affixed thereto is positioned within the heating chamber by means of a lower baffle retainer 15 and an upper baffle retainer 16. Pull 14 may be fabricated, for example, from wood. Baffle retainers 15 and 16 are merely pieces of wood or metal having a length approximately equal to the width of the heater unit chamber. Preferably, the air baffle 13 is fabricated from a resilient material such as galvanized sheet material. As may be clearly seen by reference to FIG. 2 the baffle is removed from and replaced in the heater unit chamber by merely depressing the end adjacent baffle retainer 16. A utility chamber 17 is formed by that portion of the enclosure 1 which lies on the other side of partition 5 from the heating unit chamber 10.

Conveniently, a fishing pole retainer assembly may be affixed to the outside of one of the walls of the enclosure 1. As shown best in FIG. 3 pole retainer assembly 20 comprises a solid planar pole butt support 21 running the entire width of the enclosure and a drilled planar pole butt guide 22 positioned above it a distance of one or two inches. Pole support 22 has a series of holes 23 drilled therein. These holes are of sufficient diameter to accommodate the fishing pole butt. A diameter of one inch has been found sufficient for this purpose. Preferably, the edges of pole supports 21 and 22 are beveled as indicated at 24 to prevent snagging of clothing, upholstery and the like. The pole retainer assembly also includes a resilient strap 25 positioned as shown in FIG. 1.

Affixed to the opposite side of enclosure 1 from the pole retainer assembly is a rope holder assembly 30. As may be seen from FIG. 4 the rope holder assembly 30 comprises a pair of grooved cross members 31 fitted together in such a manner that their outer surfaces are planar. The grooved cross members 31 are supported by a strut 32 which is affixed to the side of enclosure 1.

When it is desired to go fishing or hunting in cold weather a heating unit 40 of any suitable dimensions is placed in the heating unit chamber 10. Such items as a lunch, extra fuel for the heating unit, fishing tackle, knives and the like may be placed in the utility chamber 17. Conveniently, a rope may be wound around the strut 32 of rope holder assembly 30. If the particular excursion is for fishing, the fishing poles may be placed in the pole retainer assembly 20 by merely stretching elastic 25 and passing the butt of the fishing pole therethrough and into hole 23. The butt of the fishing pole will rest on support 21.

When the hunting or fishing site is reached, it is necessary only to remove baffle 14, ignite the heating unit, replace baffle 14 and close the lid 2. The hunter or fisherman may then sit on the lid. Cold air enters the heating chamber via ducts 11 warmed by the heating unit, and passes out through ducts 12. As the warm air escapes from the heating chamber it passes upward warming the hunter or fisherman's hands and face. When the day's activities have been completed it is necessary only to remove baffle 13 by grasping insulated handle 14 and extinguish the heating unit. Any fish or the like which it is desired to take along may be placed in the utility box.

Although a preferred embodiment of this invention has been described in detail, it should be understood that the invention is not limited to the exact details of the embodiment described and that all devices coming within the spirit of this invention are to be covered by this patent unless the claims expressly state otherwise.

I claim:

1. A fishing and hunting heating box comprising:
   an enclosure having a bottom and a plurality of sides;
   a lid for said enclosure;
   means for removably affixing said lid to said enclosure;
   a cold air intake vent positioned at the lower section of one wall of said enclosure, said intake vent forming an air passage whereby cold air enters said enclosure;
   a warm air outlet vent positioned at the upper section of said one wall of said enclosure, said outlet vent forming an air passage whereby warm air escapes said enclosure; and
   an arcuate air baffle of approximately the same width as said enclosure extending in an upward direction from an intermediate section of the wall opposite said one wall to a section of said one wall above said outlet vent.

2. The combination as set forth in claim 1 in which said enclosure has the shape of a rectangular solid.

3. The combination as set forth in claim 2 which further comprises:
   a plurality of legs affixed to said bottom of said enclosure.

4. The combination as set forth in claim 3 which further comprises:
   lower baffle retainer means affixed to the wall opposite said one wall; and
   upper baffle retainer means affixed to said one wall, said upper baffle retainer means being positioned above said outlet vents.

5. The combination as set forth in claim 4 in which said upper and lower baffle retainer means comprise strips of material projecting into said enclosure, said strips running parallel to said bottom of said enclosure for a distance equal approximately to the width of said enclosure.

6. The combination as set forth in claim 5 in which said arcuate air baffle is fabricated from a resilient material and has a heat insulating pull attached thereto such that it may be removed from said enclosure.

7. The combination as set forth in claim 6 which further comprises:
   a carrying strap attached to said enclosure.

8. A fishing and hunting heating box comprising:
   an enclosure having a bottom and a plurality of sides;
   a lid for said enclosure;
   means for removably affixing said lid to said enclosure;
   a partition for dividing said enclosure into first and second chambers;
   a cold air intake vent positioned at the lower section of one wall of said first chamber, said intake vent forming an air passage whereby cold air enters said first chamber;
   a warm air outlet vent positioned at the upper section of said one wall of said first chamber, said outlet vent forming an air passage whereby warm air escapes said enclosure; and
   an arcuate air baffle of approximately the same width as said first chamber extending in an upward direction from an intermediate section of the wall opposite said one wall to a section of said one wall above said outlet vent.

References Cited by the Examiner

UNITED STATES PATENTS

| | | | |
|---|---|---|---|
| 374,219 | 12/1887 | Voltz | 126—275 |
| 2,698,646 | 1/1955 | Hepworth | 126—204 |
| 2,829,635 | 4/1958 | Teller | 126—208 |
| 2,845,924 | 8/1958 | Benda | 126—208 |
| 2,904,031 | 9/1959 | Scott | 126—204 |

FREDERICK L. MATTESON, JR., *Primary Examiner.*

E. G. FAVORS, *Assistant Examiner.*